UNITED STATES PATENT OFFICE.

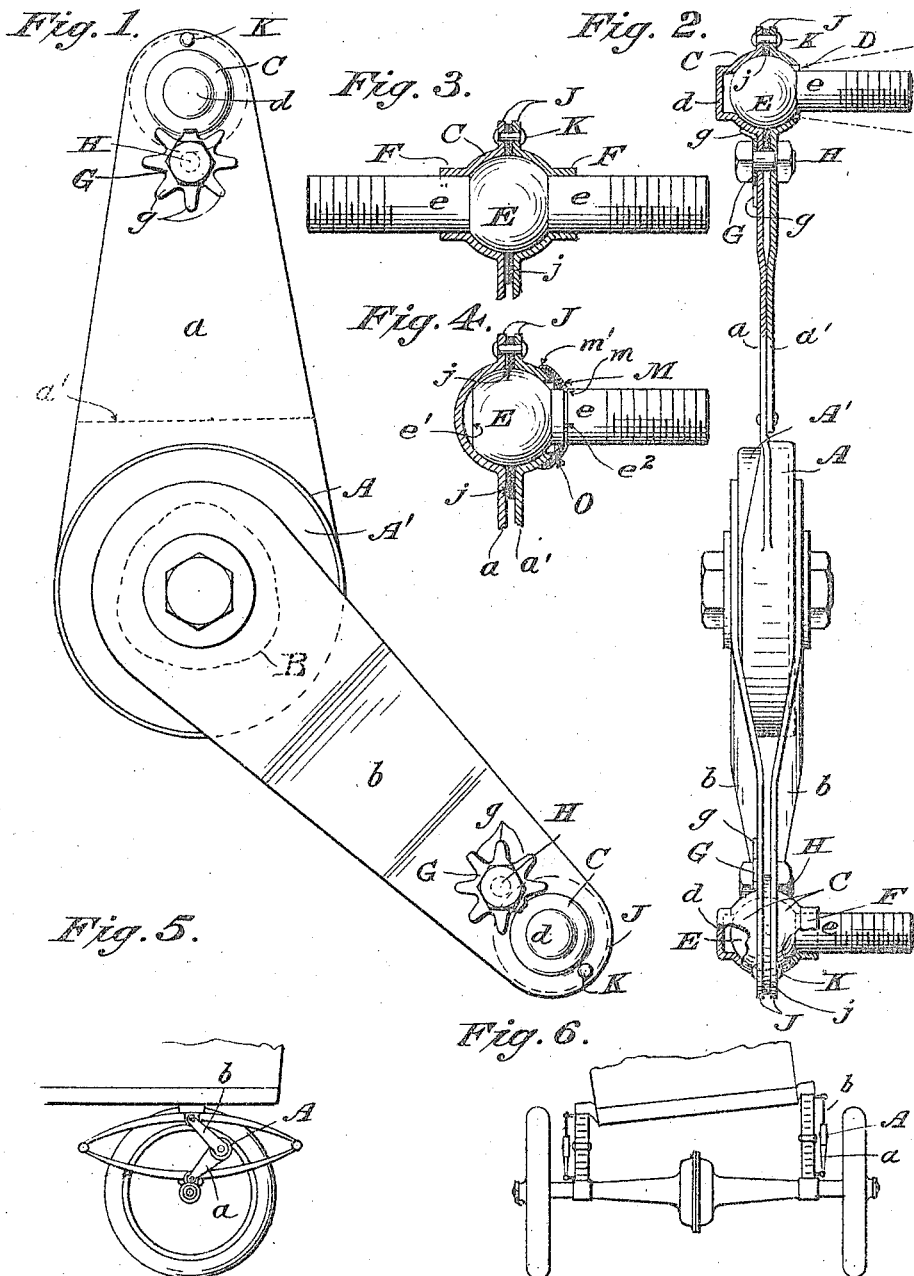

PHELPS M. FREER, OF DETROIT, MICHIGAN.

MEANS FOR CONNECTING RETARDING DEVICES.

1,213,797.

Specification of Letters Patent.

Patented Jan. 23, 1917.

Application filed February 9, 1911. Serial No. 607,491.

*To all whom it may concern:*

Be it known that I, PHELPS M. FREER, a citizen of the United States, residing at Detroit, in the county of Wayne and State of Michigan, have invented a certain new and useful Improvement in Means for Connecting Retarding Devices, of which the following is a full, clear, and exact description.

This invention relates to means for connecting to other bodies devices of a class consisting of two hinge-connected members which are free to rotate on their common axis and one or both of which are provided with a lever arm or arms. These members are respectively connected to two relatively movable bodies whose movements and also whose relative positions of rest are very irregular, within a limited range, as they respond to the varying conditions of service.

The principal object of the invention is to provide means for so connecting these hinged members of the device to the respective movable bodies that the free movements of the bodies shall not be impaired and at the same time there shall be no twisting or distortion of the device nor cramping of its hinge action through or by reason of such connections.

A further object of importance is to so arrange these connections that while they allow the greatest freedom of movement in all the associated parts provision is made for holding the device in a proper working plane relatively to the two bodies to which it is connected. These devices not only serve to modify the spring action but to resist in a measure the side sway of the vehicle.

These and other objects of the invention are carried into effect by means of the peculiar arrangements of stud bolts having spherical heads which take into corresponding sockets formed in the hinged members of the friction device, as will hereinafter be more fully described and claimed.

These connections are intended for use with any kind of a hinge device which is to be connected to two movable bodies and is particularly useful in connecting a friction device or shock absorber between the spring-supported chassis and axle frame of an automobile or like vehicle in which the relative movements and positions of the chassis and axle frame are very irregular owing to the rough road surfaces or unequal loading. A deep hole in one side of the roadway will cause a greater disturbance in the relations of the parts of the vehicle on that side than on the other, while unequal loading may depress one side of the chassis or body far below the other and cause it to assume an angular position relatively to the axle frame which in its spring movements would cramp a rigidly held friction device.

In the accompanying drawing the invention is, for convenience, illustrated in connection with a desirable form of shock absorber for automobiles.

Figure 1 is a side elevation of a shock absorber for automobiles provided with a casing and two lever arms to the free ends of which this invention is applied to connect them respectively to the axle frame and chassis of an automobile. Fig. 2 is an edge view of the same with some of the parts broken away and others in section to more clearly disclose the invention. Fig. 3 is a detail of one form of the connecting bolt with its socket partly in section. Fig. 4 is a similar view of another form of bolt. Fig. 5 is a diagrammatic side elevation of a portion of an automobile with shock absorbers applied to the springs between the chassis and axle frame. Fig. 6 is a similar rear elevation of the same, showing the body inclined to one side, a position which might be assumed through unequal loading.

The shock absorber illustrated in the drawings preferably consists of a casing A, A' inclosing a cam B (see Fig. 1,) which rotates upon the axis of the casing and is operated upon by any suitable retarding devices inclosed within the casing. An arm $a$ of plate metal is rigidly connected to and extends from the casing while a similar arm $b$ rigidly connected to the cam B is preferably made in two parts or plates which are connected to the hubs of the cam at each side of the casing, and are brought together at their outer ends to form a single arm of double thickness. The other arm $a$ leaves the casing as a single member but preferably has another thickness of plate $a'$ added to it so that it is doubled at its extremity, similar to arm $b$. These arms are made in two parts or plates, as stated, for convenience in forming the spherical sockets C in their ends. These sockets are pressed hemispherically into the end of each plate of each arm and practically form complete spherical sockets when the two plates of an arm are joined.

Transverse apertures D extend through the walls of the sockets for the passage of the shanks e of the stud bolts whose spherical heads E fit into the sockets. In some cases where attachment at one side only is convenient, single shanked stud bolts such as shown in Figs. 2 and 4 are used. In this event one side only of the socket need be apertured for the passage of the bolt shank. With this construction an oil cup d may be pressed in the bottom of the opposite side of the socket, as shown in Figs. 1 and 2, to provide space for the accumulation of lubricant. This cup formation may be omitted in some cases and the half socket made fully hemispherical, space for storage of the lubricant being made by flattening the head of the ball as shown at e' in Fig. 4.

In some cases, where both sides of the arms are accessible for making connections, bolts with shanks on opposite sides of their spherical heads, as shown in Fig. 3, may be employed. In such event both hemispherical sockets must be apertured for the passage of the bolt shanks e and provision for oil storage omitted. As will be seen at the top of Fig. 2 and also in Fig. 4, the apertures D are quite a bit larger than the bolt shanks passing through them, thereby permitting free angular swing of the bolt shank in any direction. This allows of a wide range of movement of the body to which the bolt is attached without cramping either the ball joint of the connection or the hinge joint of the device. In some cases it is desirable to prevent this free angular movement and confine the arm a or b of the device to rotary movement around the axis of the bolt without changing its plane of rotation. To effect this the apertures D through the walls of the sockets are made snug fits upon the bolt shanks e thus preventing any but rotary motion of the arms on the bolt shanks and heads. As a further precaution and to provide greater wearing surface the apertures are extended through sleeves F which are snugly fitted upon the bolt shanks for a suitable distance away from the sockets.

In the ordinary use of this invention, say for connecting shock absorbers to the axle and spring-supported chassis of an automobile, it is very desirable that the friction device be so attached that it will permit and follow the irregular movements and positions of the chassis while retaining its own position relatively to the two bodies between which it acts. To effect this result one arm of the friction device is provided with a socket aperture D that fits loosely upon the bolt shank e as shown in Figs. 2 and 4, while the other arm has the close fitting sleeved aperture F that retains the friction device in a desired plane relatively to the longitudinal axis of its bolt. Both forms of socket apertures may therefore be used at the same time, one at the extremity of each arm, each coöperating with the other to properly support the friction device while allowing wide range of variable movement of the chassis.

In order to compensate for wear in the ball-and-socket joints the parts are so proportioned that when the spherical heads are in the sockets the adjacent surfaces of the two halves of the sockets are held slightly apart by the ball which they embrace with spring pressure. This spring pressure may be attained by making the arm plates themselves of spring metal or by the employment of special springs such, for instance, as the spider springs G shown in the drawings. These springs are normally dished or saucer shaped so that their radial fingers g first contact with the outer surfaces of the arm plates. Clamping bolts H pass through the central web portion of these springs and draw them down so that their central portions are just brought into fair touching contact with the arm plates, while their radial fingers exert spring pressure to force the sockets into firmer contact with the ball heads. The bolts also serve to positively hold the plates against accidental separation.

In order to exclude dust or dirt from the ball-and-socket joints the inner edges of the half sockets may be provided with flanges J between which gaskets j are placed. These gaskets are preferably of soft felt or similar suitable material, adapted to yield as the sockets are closed to compensate for wear, and also adapted to become saturated with lubricating oil and pass it through to the joint inside. The flanges may be connected by rivets or screws K if desired, but care should be exercised that they be so set as not to produce clamping pressure over that of the springs and that the rivets like the bolts H simply act to hold the two parts of the socket from undue separation.

In order to prevent the entrance of dust or grit into the socket through the apertures D an annular ring or cap M (Fig. 4) of very thin metal, stamped or spun into shape, is employed, its inner edge m fitting into a shallow groove e² in the shank of the bolt, while an annular peripheral flange m' bears against the outside of the socket and forms a recess between the cap and socket in which lies a soft washer or gasket O.

Having described my invention, I claim:

1. In a friction device having two rotatable members pivotally connected on a common axis and provided with frictional means adapted to retard their relative rotation and having lever arms connected to and extending radially from the respective members, the combination of spherical sockets formed in the free ends of the arms and apertured through their sides, with stud bolts having spherical heads adapted to lie in the sockets and reduced shanks which extend out through said apertures with sufficient play in the aperture of one of said arms to permit free angular movement of its stud shank therein, while the aperture of the other arm snugly fits upon its stud shank to prevent any but rotary movement on its axis, thereby maintaining the frictional device in its proper plane transverse to said axis.

2. In a friction device having two rotatable members pivotally connected on a common axis and provided with frictional means adapted to retard their relative rotation and having lever arms connected to and extending radially from the respective members, the combination of spherical sockets formed in the free ends of the arms and apertured through their sides, with stud bolts having spherical heads adapted to lie in the sockets and reduced shanks which extend out through said apertures, with sufficient play in the aperture of one of said arms to permit free angular movement of its stud shank therein, while the aperture of the other arm is provided with a sleeve extension which snugly fits upon its stud shank to prevent any but rotary movement on its axis thereby maintaining the friction device in its proper plane transverse to said axis.

3. In a friction device having two rotatable members pivotally connected on a common axis and provided with frictional means adapted to retard their relative rotation and having lever arms connected to and extending radially from the respective members, the combination of the arms having their ends made in two parts with hemispherical sockets in each part, an oil receptacle formed in the top of one half socket and an aperture through the wall of the other half-socket, with means for holding the two parts together, a stud bolt having a spherical head adapted to lie in the closed socket with its reduced shank projecting out through said aperture.

4. In a friction device having two rotatable members pivotally connected on a common axis and provided with frictional means adapted to retard their relative rotation and having lever arms connected to and extending radially from the respective members, the combination of the arms having their ends made in two parts with hemispherical sockets in each part and apertures through the side walls thereof, stud bolts having spherical heads adapted to lie in the closed sockets with their reduced shanks projecting out through said apertures, means for holding the two socketed parts of the arms slightly apart when the heads are fitted in the closed sockets, with annular gaskets of suitable soft material to exclude dust from and pass oil into the sockets, lying in the space between the two said parts.

5. In a friction device having two rotatable members pivotally connected on a common axis and provided with frictional means adapted to retard their relative rotation and having lever arms connected to and extending radially from the respective members, the combination of the arms having their ends made in two parts with hemispherical sockets in each part and apertures through the side walls thereof, stud bolts having spherical heads adapted to lie in the closed sockets with their reduced shanks projecting out through said apertures, means for holding the two socketed parts of the arms slightly apart when the heads are fitted in the closed sockets, and springs tending to force the said two parts into closer relation and thereby compensate for wear in the ball-and-socket joints.

6. In a friction device having two rotatable members pivotally connected on a common axis and provided with frictional means adapted to retard their relative rotation and having lever arms connected to and extending radially from the respective members, the combination of the arms having their ends made in two parts with hemispherical sockets in each part and apertures through the side walls thereof, stud bolts having spherical heads adapted to lie in the closed sockets with their reduced shanks projecting out through said apertures, the two socketed parts being held slightly apart by the spherical heads fitted therein, with spring pressure tending to force them closer together upon the bolt heads and thereby compensate for wear in the ball-and-socket joint, and means to hold them against further separation.

7. In a hinge jointed device having arms adapted to be connected to each of two bodies which are spring connected and subject to relatively irregular movements and positions, the combination of said device having spherical sockets formed in the ends of its arms with apertures through the side walls thereof, stud bolts having spherical heads adapted to fit snugly in said sockets with reduced shanks extending out through said apertures and adapted to be secured respectively to said movable bodies, the side apertures of one arm loosely fitting on the stud shank of its bolt to permit its free angular movement, a sleeve extension on the socket of the other arm apertured to snugly fit upon the stud shank of its bolt and prevent any but rotative movement around the axis of said shank.

8. In a ball-and-socket joint, the combination of a member having a spherical socket apertured at one side and formed with an oil recess in the side opposite said aperture, a member having a spherical head adapted to fit snugly in said socket and a reduced shank projecting out through said aperture, said aperture having a sleeve extension adapted to snugly fit upon said shank and restrain the said parts from any but relatively rotary movement about the axis of said shank.

9. The combination with a pair of members having free ends and pivoted together for angular movement about a common axis, means for retarding such relative angular movement, a connecting stud carried by each free end of said members, said studs being provided with enlarged bearing portions, and the said free ends being provided with coöperative enlarged bearing faces.

In testimony whereof, I hereunto affix my signature in the presence of two witnesses.

PHELPS M. FREER.

Witnesses:
H. R. JACK,
E. R. MAY.